US009023184B2

(12) United States Patent
Yamada et al.

(10) Patent No.: US 9,023,184 B2
(45) Date of Patent: May 5, 2015

(54) ELECTRIC DEVICE FOR PRODUCING DEIONIZED WATER

(75) Inventors: Kyosuke Yamada, Tokyo (JP); Chika Kemmochi, Tokyo (JP); Shinichi Ohashi, Tokyo (JP)

(73) Assignee: Organo Corporation, Tokyo (JP)

( * ) Notice: Subject to any disclaimer, the term of this patent is extended or adjusted under 35 U.S.C. 154(b) by 100 days.

(21) Appl. No.: 13/823,081

(22) PCT Filed: Aug. 29, 2011

(86) PCT No.: PCT/JP2011/069371

§ 371 (c)(1), (2), (4) Date: Mar. 13, 2013

(87) PCT Pub. No.: WO2012/035963

PCT Pub. Date: Mar. 22, 2012

(65) Prior Publication Data

US 2013/0180858 A1 Jul. 18, 2013

(30) Foreign Application Priority Data

Sep. 14, 2010 (JP) ................................ 2010-205767

(51) Int. Cl.

| | |
|---|---|
| ***C02F 1/469*** | (2006.01) |
| ***B01D 61/46*** | (2006.01) |
| ***B01D 61/52*** | (2006.01) |
| *B01D 61/42* | (2006.01) |
| *B01D 61/44* | (2006.01) |
| *B01D 61/48* | (2006.01) |
| *B01D 61/50* | (2006.01) |

(52) U.S. Cl.

CPC .............. *C02F 1/4695* (2013.01); *B01D 61/48* (2013.01); *B01D 2313/02* (2013.01); *C02F 2201/004* (2013.01); *C02F 2201/46105* (2013.01); *C02F 2201/46115* (2013.01)

(58) Field of Classification Search

CPC ..... C02F 1/4695; C02F 1/4693; B01D 61/46; B01D 61/48

See application file for complete search history.

(56) References Cited

U.S. PATENT DOCUMENTS 5,203,976 A * 4/1993 Parsi et al. .................... 204/632
6,394,052 B2 * 5/2002 Miyasaka et al. .......... 123/90.17

(Continued)

FOREIGN PATENT DOCUMENTS

JP 2002-011477 A 1/2002
JP 3800571 B2 5/2006

(Continued)

*Primary Examiner* — Keith Hendricks
*Assistant Examiner* — Salil Jain
(74) *Attorney, Agent, or Firm* — Knobbe Martens Olson & Bear LLP

(57) ABSTRACT

The present invention provides an electric device for producing deionized water comprising: desalting chamber (4) defined by at least two ion-exchange membranes (1, 2) and filled with an ion exchanger; first concentration chamber (5*a*) positioned adjacent to one side of the desalting chamber with one of the ion-exchange membranes therebetween; second concentration chamber (5*b*) positioned adjacent to the other side of the desalting chamber with another of the ion-exchange membranes therebetween; and a pair of electrode chambers (6*a*, 6*b*) with one electrode chamber being disposed at the outer side of first concentration chamber (5*a*) and the other electrode chamber being disposed at the outer side of second concentration chamber (5*b*), wherein the electric device for producing deionized water is provided with: main body part (20) formed to include desalting chamber (4), concentration chambers (5*a*, 5*b*), and electrode chambers (6*a*, 6*b*); a pair of fixing plates (9*a*, 9*b*) disposed in such a way that main body part (20) is positioned therebetween; and elastic body (7). Elastic body (7) is disposed in such a way that the fixing plates (9*a*, 9*b*) and the elastic part (7) apply compressive stress to main body part (20) in arrangement direction of desalting chamber (4), concentration chambers (5*a*, 5*b*), and electrode chambers (6*a*, 6*b*).

5 Claims, 5 Drawing Sheets

(56) References Cited

U.S. PATENT DOCUMENTS

| | | | | |
|---|---|---|---|---|
| 6,776,401 | B2 * | 8/2004 | Krickau et al. | 267/167 |
| 2007/0051684 | A1 * | 3/2007 | Grebenyuk et al. | 210/681 |
| 2010/0078317 | A1 * | 4/2010 | Bourgeois | 204/258 |

FOREIGN PATENT DOCUMENTS

| | | | |
|---|---|---|---|
| JP | 2006-218382 | A | 8/2006 |
| JP | 2007-268331 | A | 10/2007 |
| JP | 2008-284488 | A | 11/2008 |

* cited by examiner

ELECTRIC DEVICE FOR PRODUCING DEIONIZED WATER

CROSS-REFERENCE TO RELATED APPLICATIONS

This application is the U.S. National Phase under 35. U.S.C. §371 of International Application PCT/JP2011/069371, filed Aug. 29, 2011, which claims priority to Japanese Patent Application No. 2010-205767, filed Sep. 14, 2010. The disclosures of the above-described applications are hereby incorporated by reference in their entirety. The International Application was published under PCT Article 21(2) in a language other than English.

TECHNICAL FIELD

The present invention relates to an electric device for producing deionized water suitably applicable for producing so called deionized water used as boiler water, condensate of a power plant, or water of a steam generator of a power plant.

BACKGROUND ART

Passing water to be treated through an ion-exchange resin to deionize the water has been known as a method for producing deionized water (hereinafter also referred to as "desalted water"). In this method, when the ion-exchange resin is saturated with ions, the ion-exchange resin needs to be regenerated by chemicals. In order to eliminate such a disadvantageous point in a treatment operation, a deionized water producing method, which uses an electric deionization that does not require the regeneration by the chemicals, has been established and put into practice.

In an electric device for producing deionized water that performs such a desalting treatment, for example, as shown in FIG. 1, basically, a chamber defined by a cation exchange membrane 107 and an anion exchange membrane 108 is filled with an ion exchanger, whereby desalting chamber 101 is constructed. Concentration chambers 102*a*, 102*b* are provided on both sides of desalting chamber 101. Desalting chamber 101 and concentration chambers 102*a*, 102*b* are interposed between two electrode chambers 103*a*, 103*b*, that is, between an anode chamber having an anode and a cathode chamber having a cathode, whereby main body part 104 is constructed. Water to be treated 105 is passed through a layer of the ion exchanger filled in desalting chamber 101. Voltage is placed between the anode and the cathode, thereby applying a direct current in a direction orthogonal to the flow of water to be treated 105 via both ion exchange membranes. In this way, impurity ions in water to be treated 105 are electrically removed into concentrated water flowing in concentration chambers 102*a*, 102*b* arranged outside both ion-exchange membranes, whereby deionized water is produced as treated water 106.

The type of main body part 104 of the electric device for producing deionized water includes multilayered plate type structure, a spiral type, and a concentric type.

In the case of an electric device for producing deionized water of multilayered plate type structure, a plurality of desalting chambers 101 each of which has an ion exchanger interposed between cation exchange membrane 107 and anion exchange membrane 108 are adjacently arranged via concentration chambers 102*a*, 102*b* into which ions are removed and have cathode chamber 103*a* and anode chamber 103*b* arranged on both ends thereof. FIG. 1 shows multilayered plate type structure having one desalting chamber 101 as an example.

Such an electric device for producing deionized water of multilayered palte type structure has an advantage in which the value of current applied to each chamber is uniform. However, the desalting chamber, the concentration chambers, the electrode chambers are arranged adjacently and are pressed to each other by fastening bolts or the like, so when the fastening force is weak, gaps are produced between the chambers to thereby raise the possibility of the occurrence of water leakage when water is passed through the chambers. Generally, in order to prevent water leakage, in the electric device for producing deionized water of multilayered plate type structure, sturdy fixing plates 109 are arranged on the outside of both ends in a direction in which the respective chambers of main body part 104 are arranged and fixing plates 109 are coupled to each other with bolts 111. Main body part 104 is fastened strongly by means of bolts 111.

Further, gaskets 110 are usually interposed between the respective chambers of desalting chamber 101, concentration chambers 102*a*, 102*b*, and electrode chambers 103*a*, 103*b*. Gaskets 110 seal gaps in contact portions of the respective chambers and hence prevent water leakage. Generally, a rubber sheet or a rubber ring is used as the gasket 110.

In a case where water to be treated at high temperature (40° C. or more) is passed through the electric device for producing deionized water of multilayered plate type structure described above, the main body part is thermally expanded by an increase in temperature above ambient temperature. However, in a case where the fixing plates and bolts are made of metal and the respective chambers are made of plastic, since the plastic is generally higher in the coefficient of thermal expansion than the metal, the main body part sandwiched by the fixing plates cannot be expanded in the direction in which the respective chambers are arranged but is expanded and deformed in a direction perpendicular to the direction in which the respective chambers are arranged. When the temperature returns to ambient temperature, the respective chambers contract but the deformed portions cannot perfectly return to their original shape and the respective chambers contract in the direction in which the respective chambers are arranged. As a result, gaps are produced between the respective chambers which results in water leakage.

In addition, since the composition of material of the main body part is not uniform, there is also the possibility that gaps will be produced even when the respective chambers are deformed by thermal expansion.

These conditions are likely to be caused, for example, in a desalting device for treating hot water. In particular, water leakage is not permitted to occur in a nuclear power plant and hence use of the current device is not allowed.

TECHNICAL DOCUMENT OF THE RELATED ART

Patent Document

Patent document 1: Japanese Unexamined Patent Publication No. 2007-268331

Patent document 2: Japanese Patent No. 3800571

DISCLOSURE OF THE INVENTION

The present invention has been made in view of the problems described above. An object of the present invention is to prevent a gap and water leakage from being caused even under circumstances in which the temperature environment is changed in an electric device for producing deionized water that has multilayered plate type structure.

One embodiment of the present invention relates to an electric device for producing deionized water including: a desalting chamber defined by at least two ion-exchange membranes and filled with an ion exchanger; a first concentration chamber arranged adjacently to the desalting chamber via one ion-exchange membrane on one side of the desalting chamber; a second concentration chamber arranged adjacently to the desalting chamber via another ion-exchange membrane on another side of the desalting chamber; and a pair of electrode chambers arranged respectively outside the first concentration chamber and the second concentration chamber.

In this embodiment, the present invention is characterized by including:

a main body part including the desalting chamber, the concentration chambers, and the electrode chambers;

a pair of fixing plates disposed in such a way as to sandwich the main body part; and an elastic body, wherein the elastic body is arranged in such a way that compression stress in a direction in which the desalting chamber, the concentration chambers and the electrode chambers are arranged is applied to the main body part by the fixing plates and the elastic body.

Effects of the Invention

According to the present invention, in the electric device for producing deionized water, the elastic body can follow expansion or contraction caused in the respective chambers under circumstances where a temperature environment is changed, for example, in a case where water to be treated at high temperature is passed or where a device is used under high temperature circumstances, so that gaps are not produced between the respective chambers and hence water leakage can be prevented.

MODE FOR CARRYING OUT THE INVENTION

Hereinafter, an embodiment of the present invention will be described with reference to the accompanying drawings.

Figure 2:
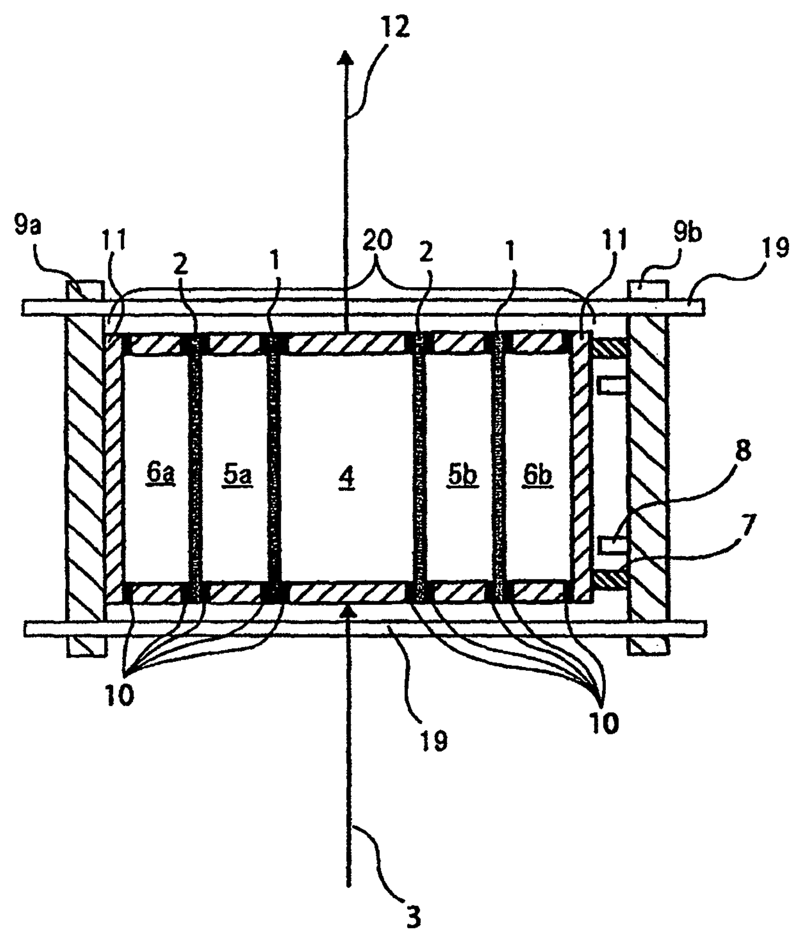
FIG. 2 is a schematic section view of a basic construction of an electric device for producing deionized water according to an embodiment of the present invention.

FIG. 2 shows a basic construction of an electric device for producing deionized water according to one embodiment of the present invention.

In FIG. 2, a chamber defined by cation-exchange membrane 1 on one side and anion-exchange membrane 2 on the other side is filled with an ion exchanger (for example, ion-exchange resin, monolithic organic porous ion exchanger, and ion-exchange fiber), whereby desalting chamber 4 is constructed. Desalting chamber 4 desalts water to be treated 3 to produce deionized water. Here, it is only necessary that desalting chamber 4 be defined by at least two ion-exchange membranes and in FIG. 2, one side of the desalting chamber 4 be defined by a cation-exchange membrane 1 and the other side of the desalting chamber be defined by anion-exchange membrane 2. However, for example, both sides of desalting chamber 4 may be defined by cation-exchange membranes (or anion-exchange membranes). Further, desalting chamber 4 may include other ion-exchange membranes or desalting chamber 4 may be divided.

Desalting chamber 4 has first concentration chamber 5*a* provided on one side thereof via one ion-exchange membrane (in the present embodiment, cation-exchange membrane 1). Further, desalting chamber 4 has second concentration chamber 5*b* provided on the other side thereof via anther ion-exchange membrane (in the present embodiment, anion-exchange membrane 1).

On the respective outsides of desalting chambers 5*a*, 5*b* are arranged one pair of electrode chambers 6*a*, 6*b* (in the present embodiment, electrode chamber 6*a* is a cathode chamber and electrode chamber 6*b* is an anode chamber). An ion-exchange membrane (cation-exchange membrane 1 or anion-exchange membrane 2) is interposed between concentration chamber 5*a* and electrode chamber 6*a* and also between concentration chamber 5*b* and electrode chamber 6*b*. Further, each of electrode chambers 6*a*, 6*b* is provided with an electrode plate (in the present embodiment, electrode chamber 6*a* is provided with a cathode plate and electrode chamber 6*b* is provided with an anode plate). The outsides of electrode chambers 6*a*, 6*b* are closed by side walls 11, respectively. Voltage is placed between the pair of electrodes to apply direct current orthogonally to the flow of the water to be treated 3 via the ion-exchange membranes. In this way, impurity ions in the water to be treated 3 are electrically removed into concentrated water (not shown) flowing in concentration chambers 5*a*, 5*b*, whereby deionized water is produced as treated water 12.

In FIG. 2 is shown the embodiment in which concentration chambers 5*a*, 5*b* are provided on both sides of desalting chamber 4. However, a plurality of desalting chambers and a plurality of concentration chambers 5*a*, 5*b* can be arranged.

Figure 3:
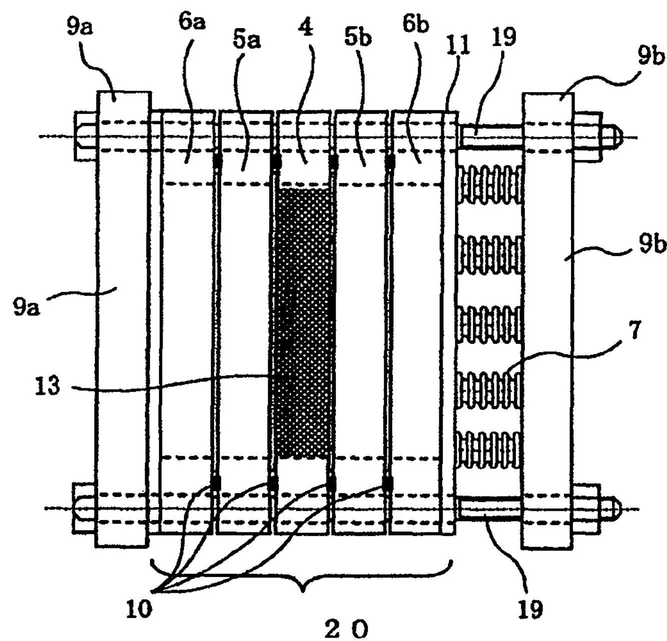
FIG. 3 shows the appearance of an assembly of a main body part, elastic bodies, stoppers, and fixing plates shown in FIG. 2.
Figure 4:
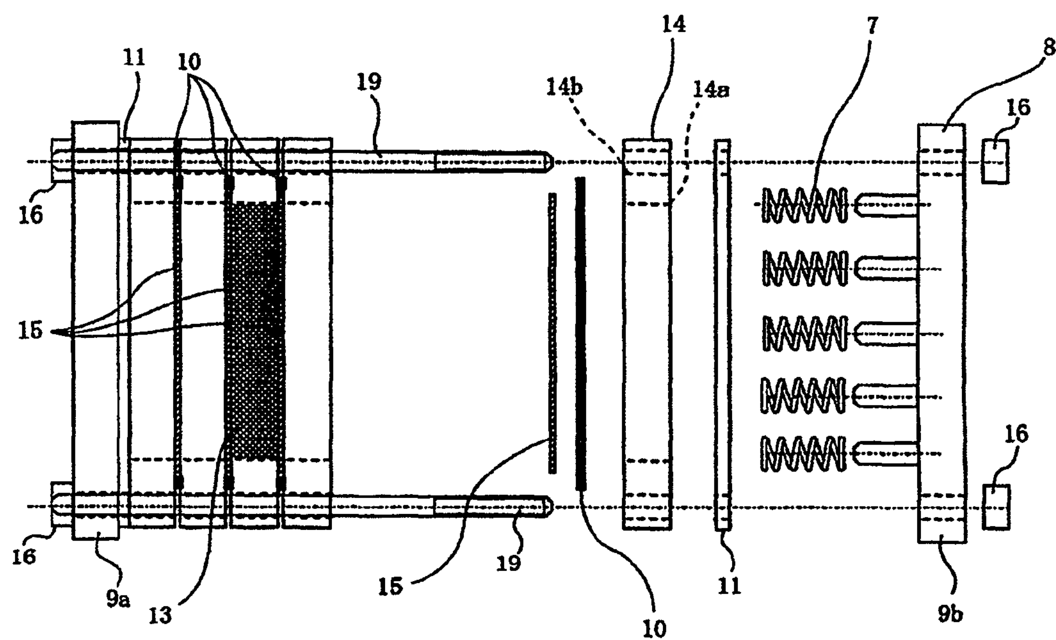
FIG. 4 shows a process of assembling the main body part, the elastic bodies, the stoppers, and the fixing plates shown in FIG. 2.

As shown in FIG. 3 and FIG. 4, each of the desalting chamber 4, concentration chambers 5*a*, 5*b*, and electrode chambers 6*a*, 6*b* is constructed of frame body 14 having opening 14*a*. Desalting chamber 4 has ion exchanger 13 filled in opening 14*a*. It is preferable from the viewpoint of weight saving and easy working that the material of the frame body 14 be an ABS resin.

These respective chambers are arranged in such a way as to abut on each other in a line with their openings 14*a* set to each other to thereby construct multilayered body 20 (also referred to as "main body part"). A pair of fixing plates 9*a*, 9*b* are arranged on the outside of multilayered body 20. Fixing plates 9*a*, 9*b*, as shown in FIG. 3 and FIG. 4, are arranged on both sides of multilayered body 20 in such a way as to sandwich multilayered body 20 and have their positions fixed by nuts 16 and bolts 19. The bolts 19 may be installed outside multilayered body 20 to fix the positions of fixing plates 9*a*, 9*b*. Further, as shown in FIG. 4, bolts 19 may be inserted through bolt holes 14_b_ made in the frame bodies 14 of the respective chambers to fix the positions of plates 9_a_, 9_b_. It is preferable that the material of fixing plates 9_a_, 9_b_ be higher in strength and smaller in the coefficient of linear expansion than the material of frame body 14 and, for example, be SS or SUS.

Elastic bodies 7 are interposed between multilayered body 20 and one fixing plate 9_b_. In a case where elastic bodies 7 are interposed in this way, helical compression springs can be suitably used. The helical compression spring has its elastic force easily set. In addition, the helical compression spring can be installed on the bolt when multilayered body 20 is pressed by fixing plate 9_b_, so that the helical compression spring can be easily fixed. In this regard, it is only necessary that the kind of elastic body 7 be selected in such a way that fixing plates 9_a_, 9_b_ and elastic body 7 can apply stress to press frame body 14 that makes up multilayered body 20, that is, can apply compressive stress to multilayered body 20. Alternatively, fixing plates 9_a_, 9_b_ on both sides may be coupled to each other by helical tension springs.

Further, as shown in FIG. 3 and FIG. 4, gaskets 10 are sandwiched between the respective chambers of desalting chamber 4, concentration chambers 5_a_, 5_b_, and electrode chambers 6_a_, 6_b_. By fastening multilayered body 20 in a state where gaskets 10 are set in this way by fixing plates 9_a_, 9_b_ and elastic boy 7, a sealing performance is provided between the adjacent chambers to thereby prevent water leakage from a deionized water producing device. A rubber sheet or a rubber O-ring is used as gasket 10.

According to the construction of the electric device for producing deionized water described above, fixing plates 9_a_, 9_b_ and elastic body 7 can apply stress to press multilayered body 20. As a result, even in a case where the device has temperature variation that is caused when water is passed or stopped in the process of producing deionized water, a gap is not produced between the respective chambers and hence water leakage is not caused.

Elastic body 7 for producing the effect of preventing water leakage like this will be further specifically described by taking the helical compression spring as an example.

Figure 5:
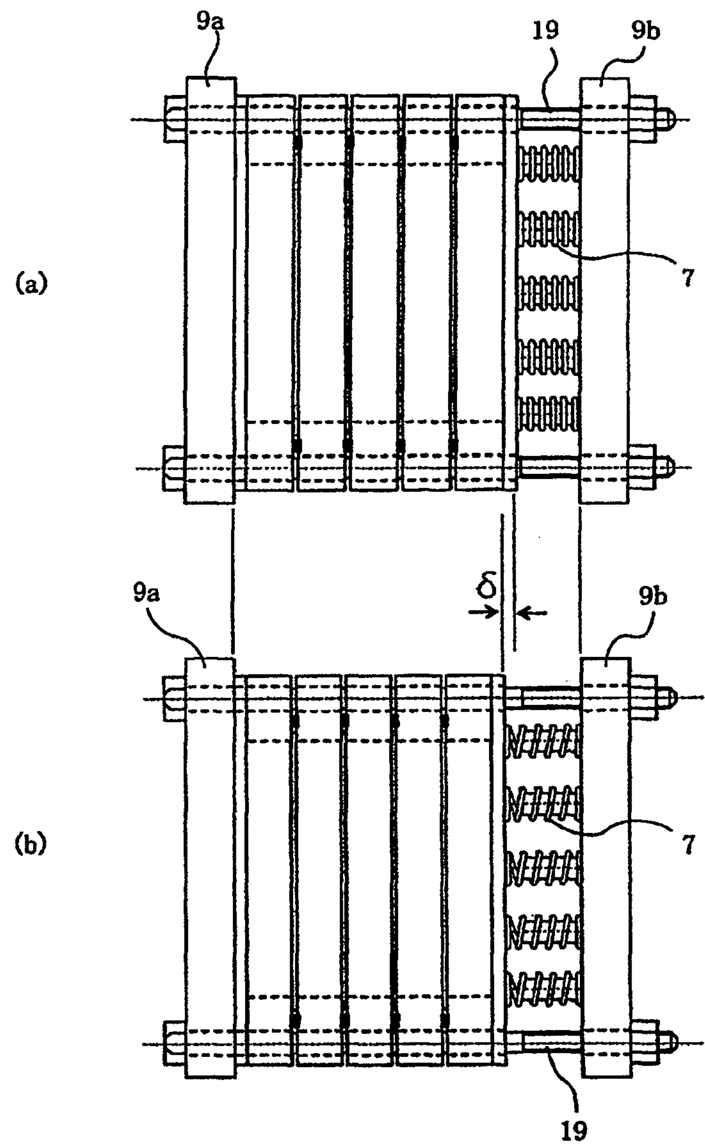
FIGS. 5A, 5B show processes in which helical compression springs follow a thermal contraction, which is caused by a temperature change in the device, having a multiplayer body shown in FIG. 2.

Elastic body 7 (hereinafter referred to as "helical compression spring" in some cases) is interposed between fixing plate 9_b_ and an end portion of multilayered body 20 in a state where elastic body 7 is compressed from a natural length (=length of the helical compression spring in a state where an external force is not applied to the compression spring) by fixing positions of the fixing plates 9_a_, 9_b_ (see FIG. 3). When the device is exposed to a high temperature of 40° C. or more, the temperatures of the respective chambers are increased and hence the frame bodies of the respective chambers are expanded. Here, helical compression springs 7 are interposed between multilayered body 20 and fixing plate 9_b_, so multilayered body 20 is not expanded by the elastic forces of elastic bodies 7 in a direction in which the respective chambers are aligned and the respective chambers are held in cross contact with each other. Thereafter, when the temperature of the device is returned to ordinary temperature, respective frame bodies 14 are contracted. In a case where the device is not provided with helical compression springs 7, when respective frame bodies 14 are contracted, gaps are produced between the respective chambers. For example, in a case where frame body 14 is made of the ABS resin, when the length of multilayered body 20 is 500 mm and the device is used in a state where the temperature difference based on when the device is assembled (ordinary temperature) is 50° C., the multilayered body 20 is contracted by about 2.5 mm because the coefficient of linear expansion of the ABS resin is about $10\times10^{-5}$ (1/K), which hence produces a gap and causes water leakage. However, according to the present invention, the respective chambers are held in closely contact with each other by the elastic forces of the helical compression springs in the direction in which the respective chambers are aligned. Hence, gaps are not produced between the respective chambers and water leakage is not caused. Further, also in a case where the frame bodies 14 are expanded and deformed in a direction perpendicular to the direction in which the respective chambers are aligned by a change in the temperature of the water to be treated that flows through the device, a gap is not produced between the close contact portions of the respective chambers by the elastic forces of the helical compression springs 7. In this regard, even in a case where the respective chambers are expanded or contracted by a temperature change in an environment in which the device is used, the situation is the same as described above. In FIG. 5A and FIG. 5B will be shown processes in which helical compression springs 7 follow the thermal contraction of multilayered body 20 caused by the temperature change of the device as described above.

As for the positions in which the helical compression springs 7 are arranged, it is preferable that a plurality of helical compression springs 7 be arranged on line 17 acquired when the inner wall faces of each of the chambers (that is, the opening edge sides of opening 14_a_ of frame body 14) are projected on fixing plate 9_b_. Alternatively, it is preferable that the plurality of helical compression springs 7 be arranged inside line 18 acquired when the outer wall faces of each of the chambers (that is, the outer peripheral side faces of frame body 14) are projected on fixing plate 9_b_. According to this arrangement, even in a case where a portion of frame body 14 of each of the chambers is expanded or contracted, it is possible to prevent a gap from being produced by the elastic forces of the helical compression springs corresponding to the expansion or contraction of frame body 14.

Further, in order to arrange helical compression springs 7 at given positions, it is preferable that pins (stoppers 8) each of which is smaller than the inside diameter of each of the helical compression springs 7 be fixed to fixing plate 9_b_. In this way, helical compression springs 7 can be easily set in such a way that each of the pins is inserted inside each of the helical compression springs 7. These pins function as stoppers 8, as will be described later.

Still further, when multilayered body 20, helical compression springs 7, fixing plates 9_a_, 9_b_ are assembled, it is preferable that the amount of deformation of each of helical compression springs 7 be made smaller than a displacement expressed by a product of the coefficient of linear expansion of multilayered body 20, the length in the direction in which the respective chambers are arranged of multilayered body 20, and a temperature change. In other words, each of helical compression springs 7 is contracted more than the amount of displacement expressed by the following formula (1) when multilayered body 20 is expanded or contracted by the temperature change in the direction in which the respective chambers are arranged in a case where multilayered body 20 is not fixed by fixing plates 9_a_, 9_b_, bolts 19, and the like.

$$a=\alpha\times\Delta T\times L_0 \quad (1)$$

a: displacement in the direction in which the respective chambers of the multilayered body 20 (that is, desalting chamber 4, concentration chambers 5_a_, 5_b_, and electrode chambers 6_a_, 6_b_) are arranged in a case where temperature of $\Delta T$ merely changed $\alpha$=coefficient of linear expansion of multilayered body 20

$L_0$=length in the direction in which the respective chambers of multilayered body 20 are arranged $\Delta T$=absolute value of temperature change Here, "the amount of displacement" means a displacement or a rotational angle developed when a load or a moment is applied to an elastic body. In particular, in a case where elastic body 7 is the helical compression spring, "the amount of displacement" means a relative displacement (amount of expansion or contraction) of both ends of the spring.

Further, in a case where gaskets 10 are interposed between desalting chamber 4, concentration chambers 5*a*, 5*b*, and electrode chambers 6*a*, 6*b*, respectively, each of the helical compression springs is contracted more than the displacement that is expressed by the following formula (2) when multilayered body 20 is expanded or contracted by a temperature change in the direction in which the respective chambers are arranged.

$$b=\alpha\times\Delta T\times L_0+P/K \quad (2)$$

b: displacement in the direction in which the respective chambers of multilayered body 20 (that is, desalting chamber 4, concentration chambers 5*a*, 5*b*, and the electrode chambers 6*a*, 6*b*) in a case where temperature of $\Delta T$ merely changed $\alpha$=coefficient of linear expansion of multilayered body 20

$L_0$=length in the direction in which the respective chambers of multilayered body 20 are arranged at the time of assembling the device $\Delta T$=absolute value of temperature change P=repulsive force developed when the gasket is crushed at the time of assembling the device K=spring constant of helical compression spring 7

The force by which helical compression springs 7 press multilayered body 20 needs to be stronger than the force that is produced from inside multilayered body 20 in a direction of fixing plate 9*b*. The force produced inside multilayered body 20 includes: 1) a hydraulic force when water flows in the desalting chamber, concentration chambers 5*a*, 5*b*, and electrode chambers 6*a*, 6*b*; and 2) the repulsive force produced when gaskets 10 of the O-ring or the like are crushed. If the force by which helical compression springs 7 press multilayered body 20 is smaller than the force that is produced inside multilayered body 20, helical compression springs 7 are contracted more than when the device is assembled to produce gaps between the respective chambers, which could cause water leakage.

For this reason, when the helical compression springs 7 contract by the amount of contraction described above, the device can maintain the sealing performance and can match with the amount $\delta$ of contraction caused by the thermal contraction of multilayered body 20.

Here, the spring constant means a force or a moment necessary for applying a unit amount of displacement (deformation or deformed angle) to a spring (JIS B0103).

Figure 6:
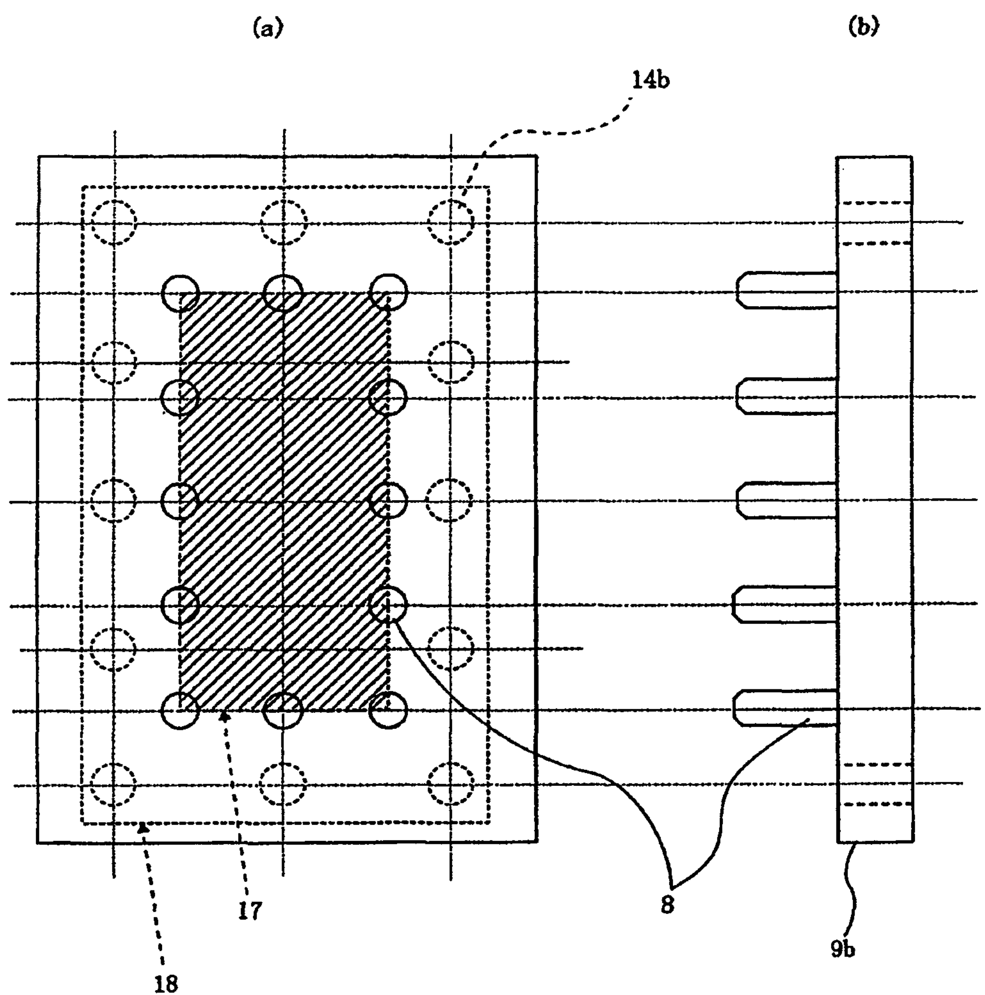
FIG. 6 shows an arrangement example of the elastic bodies and the stoppers shown in FIG. 2.

Further, in a case where when water is passed through the respective chambers of multilayered body 20, the force produced in multilayered body 20 by the hydraulic pressure is larger than the force by which helical compression springs 7 press multilayered body 20, helical compression springs 7 contract more than when the device is assembled to thereby produce gaps between the respective chambers. Thus, it is preferable that stoppers 8 (see FIG. 4) are disposed so as to prevent helical compression springs 7 from contracting more than when the device is assembled. This can prevent helical compression springs 7 from contracting more than necessary and hence a load excessively applied to multilayered body 20 by the elastic forces of helical compression springs 7 can be reduced. Each of stoppers 8 is not limited to a special one if stopper 8 does not cause each of helical compression springs 7 to contract more than necessary. However, preferably, stopper 8 is a metallic pin that can be set at the position in which helical compression springs 7 are arranged (for example, position shown in FIG. 6), that is, a metallic pin having a diameter smaller than the inside diameter of helical compression spring 7. In this way, helical compression springs 7 can be set in such a way that the pins can be inserted inside helical compression springs 7, so that the pins function as the stopper and the pins can make it easy to install and fix helical compression springs 7 as well. Further, it is preferable that each of stoppers 8 is set in such a way as to have the same length as the amount of contraction of each of helical compression springs 7 at the time of assembling the device. This can prevent bolts from being fastened more than is necessary at the time of assembling the device and hence applying an excessive amount of stress to frame body 14 can be prevented.

Here, although stoppers 8 are fixed to the fixing plate 9*b*, stoppers 8 may be fixed to side wall 11 of electrode chamber 6*b*.

Figure 7:
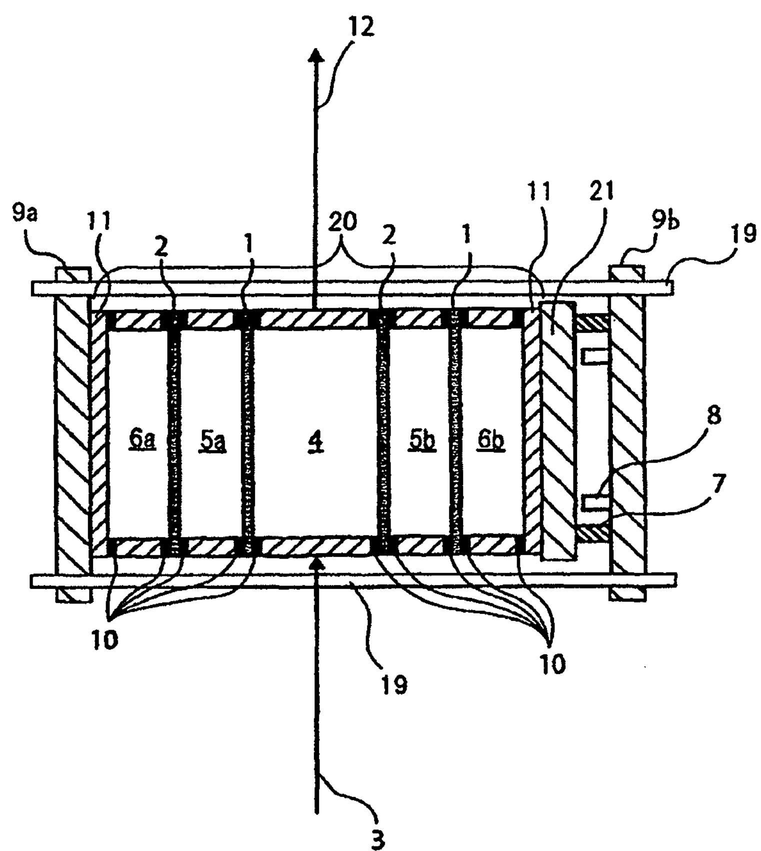
FIG. 7 is a schematic section view to show a modified embodiment of the device shown in FIG. 2.

Further, when helical compression springs 7 are in contact with multilayered body 20, multilayered body 20 has stress concentration that is caused at contact portions thereof by the effect of helical compression springs 7. As a result, the frame body is likely to be broken. Hence, as shown in FIG. 7, flat plate 21 may be set between multilayered body 20 and helical compression springs 7. In this way, helical compression springs 7 can press multilayered body 20 on the entire surface of flat plate 21, which can hence prevent a load from being applied to one point of multilayered body 20.

As to another modification, elastic bodies 7 of helical compression springs 7 and stoppers 8 are arranged only on one side of multilayered body 20 but may be arranged on both sides of multilayered body 20.

[Example]

Next, the electric device for producing deionized water will be further specifically described by taking an example. However, this is one example and the present invention is not limited to this example.

When an experimenter desalted water to be treated containing ammonium by means of a mixed bed desalting cell, the experimenter used an electric device for producing deionized water that has a construction shown in FIG. 2 under device specifications and operating conditions described below. This device was assembled in room at a temperature of 20° C. This electric device for producing deionized water was used to produce deionized water from water to be treated containing 20 mg/L of ammonium ion, 1 mg/L of sodium ion, 1 mg/L of chloride ion, and 1 mg/L of sulfate ion. The device was continuously operated at 55° C. for 1000 hours and then pure water was passed through the device and then the operation was stopped. As a result, the temperature of the device was lowered to the ordinary temperature (20° C.) but water leakage did not occur.

[Device Specifications]

In order to acquire the assessment described above, an electric device for producing deionized water that has the following specifications (whose construction is shown in FIG. 2 and FIG. 3) was used.

Desalting chamber 4: width 300 mm, height 400 mm, thickness 8 mm

Concentration chamber 5*a*, 5*b*: width 300 mm, height 400 mm, thickness 8 mm Electrode chamber 6*a*, 6*b*: width 300 mm, height 400 mm, thickness 8 mm Thickness of multilayered body 20 made of desalting chamber 4, concentration chambers 5*a*, 5*b*, and electrode chambers 6*a*, 6*b*: 480 mm Material of frame body 14 of each of desalting chamber 4, concentration chambers 5_a_, 5_b_, and electrode chambers 6_a_, 6_b_: ABS resin Ion-exchange resin filled in desalting chamber 4: mixed ion-exchange resin of anion exchange resin (A) and cation exchange resin (K) (mixing ratio A:K=1:1 by volume ratio)

Overall flow rate of deionized water producing device=1920 L/h

Circulation tank 13: liquid phase part volume 100 L

Temperature of water to be treated: 55° C.

Inlet pressure: 0.1 MPa (Specifications of Elastic Body 7)

A helical compression spring having the following specifications and setting state was used as elastic body 7 to acquire the evaluation described above.

Material of spring: SWP-B (JIS B0103)

Wire diameter of spring: 5.5 mm

Outside diameter of spring: 32 mm

Free height of spring: 100 mm

Spring constant: 59.9 N/mm/spring

Number of springs: 30

Contraction width of spring when assembled: 15 mm

Force by which spring presses multilayered body 20: 27000 N (=59.9×15×30)

(Specifications of Gasket)

Further, the experimenters used O-rings, each of which had a durometer hardness of 70 (JIS K6253), a total length of 2260 mm, a thickness of 3.53 mm, as gaskets 10 sandwiched between the respective chambers from which multilayered body 20 was constructed. In order to securely seal the clearances between the respective chambers, gaskets 10 were used in a state where the gaskets were squeezed. At this time, each of the O-rings was squeezed by a squeezing force per unit length of O-ring of 3.4 N/mm in such a way that the squeeze rate of the O-ring reached 25%, which is recommended by JIS 2406 (1991), whereby the repulsive force when the O-rings were squeezed was 7700 N.

(Force Generated in Multilayered Body 20)

When water was passed through multilayered body 20, the force hydraulically generated in the multilayered body 20 was 4000 N. Hence, the force generated in multilayered body 20 when operation of the device was stopped was only the repulsive force of 7700 N of the O-rings, but the force generated in multilayered body 20 when the device was operated was 11700 N (=4000+7700).

(Effect of Helical Compression Spring Used as Elastic Body 7)

After the operation described above was stopped, the contraction width of each of helical compression springs 7 was changed to 13 mm from 15 mm when the device was assembled. When the contraction width of helical compression spring 7 was 13 mm, the force by which helical compression springs 7 pressed multilayered body 20 was 23400 N (=59.9×13×30) and was larger than force 7700 N generated in multilayered body 20 when operation of the device was stopped. When multilayered body 20 was changed from the operating state at 55° C. to the ordinary temperature state at 20° C., multilayered body 20 contracted by 2 mm ($=10\times10^{-5}$ [1/k]×480 [mm]×(55−20)° C.=1.68 mm≅2 mm) in the direction in which the respective chambers are arranged, which raised the possibility that the gaps might be produced between the respective chambers. However, helical compression springs 7 could fill the gaps and hence water leakage did not occur. Further, the sum of a value (≅4.3 mm) acquired by dividing force 7700 N, which was generated in multilayered body 20 when the operation was stopped, by the spring constant 59.9 N/mm and the contraction width (2 mm) of multilayered body 20 became 6.3 mm. The contraction width 15 mm when helical compression springs 7 were assembled was larger than the sum. For this reason, the device could maintain the sealing performance and at the same time could match the contraction width caused by the thermal contraction of multilayered body 20.

(Effect of Stopper 8)

Next, the experimenters applied an inlet pressure of 0.75 MPa by using the water to be treated, in a state where the water outlet of the electric device for producing deionized water of the present example was closed. At this time, the amount of deformation of each of helical compression springs 7 was 15 m and water leakage did not occur. The force generated by the water pressure was 30000 N and hence the force generated in the multilayered body 20 became 37700 N (=30000+7700). That is, the force (=37700 N) generated in multilayered body 20 was larger than the force of 27000 N by which helical compression springs 7 pressed multilayered body 20 when the device was assembled. However, stoppers 8 were brought into contact with side wall 11 of electrode chamber 6_b_ and hence a force that was caused by the reaction of stoppers 8 was applied. Hence, helical compression springs 7 did not contract more than the contraction width of 15 mm when the device was assembled.

(Comparative Example)

Figure 1:
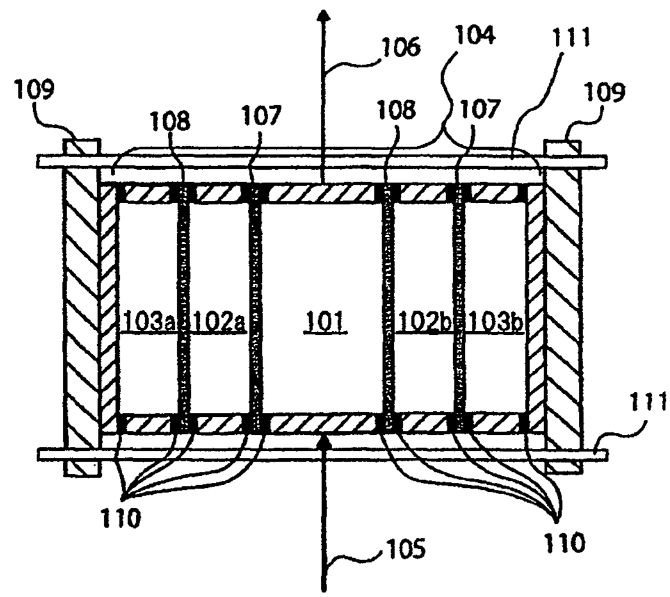
FIG. 1 is a schematic section view of a conventional structure of an electric device for producing deionized water.

When the experimenter desalted water to be treated containing ammonium by means of a mixed bed desalting cell, the experimenter used an electric device for producing deionized water (see FIG. 1) having a construction that did not include elastic bodies 7 and stoppers 8 shown in FIG. 2 and FIG. 3 under device specifications and operating conditions described below and produced deionized water from water to be treated containing 20 mg/L of ammonium ion, 1 mg/L of sodium ion, 1 mg/L of chloride ion, and 1 mg/L of sulfate ion. The device was continuously operated at 55° C. for 1000 hours and then pure water was passed through the device and then the operation was stopped. As a result, the temperature of the device was lowered to ordinary temperature (20° C.) and water leaked from the gaps between the respective chambers of multilayered body 20.

The device specifications of the comparative example were as follows.

Desalting chamber 101: width 300 mm, height 400 mm, thickness 8 mm

Concentration chamber 102_a_, 102_b_: width 300 mm, height 400 mm, thickness 8 mm Electrode chamber 103_a_, 103_b_: width 300 mm, height 400 mm, thickness 8 mm Thickness of multilayered body 20 made of desalting chamber 101, concentration chambers 102_a_, 102_b_, and electrode chambers 103_a_, 103_b_: 480 mm Material of member constructing desalting chamber 101, concentration chambers 102_a_, 102_b_, and electrode chambers 103_a_, 103_b_: ABS resin Ion-exchange resin filled in desalting chamber 102: mixed ion-exchange resin of anion exchange resin (A) and cation exchange resin (K) (mixing ratio A:K==1:1 by volume ratio)

Overall flow rate of deionized water producing device=1920 L/h

Circulation tank 13: liquid phase part volume 100 L

Temperature of water to be treated: 55° C.

Inlet pressure: 0.1 MPa

INDUSTRIAL APPLICABILITY

According to the electric device for producing deionized water that relates to the present invention, the helical compression springs match the contractions of the respective chambers, which are caused when the device is operated at a high temperature and then is returned to the ordinary temperature. Thus, it is possible to acquire an electric device for producing deionized water which does not cause water leakage. In particular, it is possible to use the electric device for producing deionized water in a facility such as a nuclear power plant in which water leakage is not permitted.

While the embodiment of the present invention has been described up to this point by the use of the example, the present invention is not limited to the example but includes engineering design changes within a scope that does not depart from the gist of the present invention. In other words, various modifications that can be achieved by those skilled in the art are included in the present invention.

This application is based upon and claims the benefit of priority from Japanese patent application No. 2010-205767, filed on Sep. 14, 2010, the disclosure of which is incorporated herein in its entirety by reference.

DESCRIPTION OF REFERENCE NUMERALS AND SIGNS

1: cation exchange membrane
2: anion exchange membrane
3: water to be treated
4: desalting chamber
5*a*, 5*b*: concentration chamber
6*a*: electrode chamber (cathode chamber)
6*b*: electrode chamber (anode chamber)
7: elastic body (helical compression spring)
8: stopper
9*a*, 9*b*: fixing plate
10: gasket
11: side wall
12: treated water
13: ion exchanger
14: frame body
14*a*: opening portion
14*b*: bolt hole
15: ion exchange membrane (cation exchange membrane 1 or anion exchange membrane 2)
16: nut
17: line acquired when inner wall face of each chamber is projected on fixing plate
18: line acquired when outer wall face of each chamber is projected on fixing plate
19: bolt
20: multilayered body (main body part)
21: flat plate

What is claimed is:

1. An electric device for producing deionized water comprising a main body part, said main body part including:
at least two-ion-exchange membranes;
a desalting chamber defined by two of the at least two ion-exchange membranes and filled with an ion exchanger;
a first concentration chamber arranged adjacently to one side of the desalting chamber via one of the two ion-exchange membranes;
a second concentration chamber arranged adjacently to another side of the desalting chamber via other of the two ion-exchange membranes;
a pair of electrode chambers disposed respectively outside the first concentration chamber and outside the second concentration chamber;
a pair of fixing plates disposed in such a way as to sandwich the main body part; and
a helical compression spring,
wherein the helical compression spring is interposed in a compressed state between at least one of the pair of fixing plates and the main body part, and the at least one of the pair of fixing plates or the main body part is provided with a stopper adapted to prevent the helical compression spring from contracting in an axial direction thereof beyond a position when the device is assembled.

2. The electric device for producing deionized water according to claim 1, wherein the stopper is inserted inside the helical compression spring.

3. The electric device for producing deionized water according to claim 1, wherein when;
a length of the main body part in the direction in which the desalting chamber, the concentration chambers, and the electrode chambers are arranged when the device is assembled is $L_0$:
an amount of contraction in axial direction of the helical compression spring with respect to said length $L_0$ in a case in which temperature is decreased by $\delta T$, is a; and
a coefficient of linear expansion of the main body part is $\alpha$,
the helical compression spring is arranged for causing contraction in the axial direction thereof no more than the amount of a that is expressed by the following formula:

$$a=\alpha\times\Delta T\times L_0.$$

4. The electric device for producing deionized water according to claim 1, further comprising gaskets,
wherein each of the gaskets is interposed between the desalting chamber and respective adjacent concentration chambers, and between the pair of electrode chambers and respective adjacent concentration chambers,
wherein
when
an amount of contraction in the direction in which the desalting chamber, the concentration chambers, and the electrode chambers of the main body part are arranged, in a case in which temperature is decreased by $\delta T$, is b;
a coefficient of linear expansion of the main body part is $\alpha$;
a length of the main body part in the direction in which the desalting chamber, the concentration chambers, and the electrode chambers are arranged when the device is assembled is $L_0$;
a repulsive force generated when the gaskets are squeezed at the time of assembling the device is P; and
a spring constant of the helical compression spring is k,
wherein the helical compression spring is arranged for causing contraction in the axial direction thereof no more than the amount of contraction b that is expressed by the following formula:

$$b=\alpha\times\Delta T\times L_0+P/k.$$

5. The electric device for producing deionized water according to claim 1, further comprising: a flat plate between the main body part and helical compression spring.

* * * * *